Sept. 12, 1939.  D. VON MIHÁLY  2,172,779

FILM APPARATUS

Filed Dec. 5, 1936  3 Sheets-Sheet 3

INVENTOR
Denes Von Mihaly
BY
Blair, Curtis & Dunne
ATTORNEYS

Patented Sept. 12, 1939

2,172,779

UNITED STATES PATENT OFFICE 2,172,779

FILM APPARATUS

Dénes von Mihály, Berlin-Wilmersdorf, Germany, assignor to Julius Pintsch Kommanditgesellschaft, Berlin, Germany Application December 5, 1936, Serial No. 114,442
In Germany December 6, 1935

11 Claims. (Cl. 88—24)

This invention relates to apparatus for recording, copying, and reproducing photographic sound records.

Apparatus for recording, copying, and reproducing photographic sound records consisting of several sound tracks located side by side on an endless film strip are known in which the beam of light that effects the recording, the copying, or the reproduction is shifted intermittently transversely to the film. Apparatus capable of such operation is shown, for example, in my copending application for United States Letters Patent Serial No. 12,326. This transverse shifting is controlled by marks provided on the film and is effected therefore automatically always at the same place on the film. Now every apparatus requires a certain starting time before driving of the film attains that constant velocity that is necessary for recording, for copying, or for reproduction, so that the portion of the first sound track run off during this time is lost. Moreover, it is very difficult, particularly in the case of recording, to time the starting so accurately that the commencement of the recording is located immediately behind the place on the film strip provided with the mark that brings about the transverse shifting of the beam of light on the film and consequently at the commencement of the first sound track, at any rate if it is not a question of the recording of a production specially made for this purpose, but, for example a question of the recording of a lecture, a speech, or the like, when the apparatus must be managed in accordance with the speaker because he cannot be told when he is to begin.

All these difficulties are avoided according to the invention by constructing the apparatus in such a manner that in the case of the primary position of the optical means which project the beam of light upon the film, the beam of light remains outside the useful width of the film, and consequently impinges for example on the perforated portion of the film, or, in the case of an imperforate film driven by friction is outside the edge of the film. When the film drive is switched on consequently the first sound track is not at once illuminated, or scanned, but rather first of all times is given to the apparatus, to attain the prescribed film velocity; on the first automatic transverse shifting of the beam of light, the beam of light first reaches the first sound track, so that the actual beginning of the recording, copying, the reproduction coincides with the commencement of the first sound track. Preferably there are also provided means for putting out of operation the automatic transverse shifting of the beam of light, for example a hand switch inserted into the circuit of electromagnetic means for effecting the transverse shifting, in order to enable the beam of light to be left inoperatively outside the useful width of the film as long as desired after the starting of the film drive. This is of advantage particularly in the case of recording apparatus, because the time (dependent on the length of the film) between two consecutive operations of the switch that effects the transverse shifting of the beam of light is known and consequently the instant of time of the first transverse shifting which occurs after the putting into operation of the automatic transverse shifting of the beam of light and which transfers the beam of light to the first sound track, can be exactly determined beforehand and the starting of the thing to be recorded can be determined accordingly. With the hand switch located in the circuit of the electromagnet that effects the transverse shifting of the beam of light there may be connected a signal lamp arranged at or in the microphone and a second signal lamp may be connected in parallel with the electromagnet; the first signal lamp serves as a warning signal, whilst the second signal lamp indicates the instant of the switching over to the first sound track.

In the case of the recording of a speech made before a large circle of listeners the steps mentioned would not suffice for securing the coincidence of the commencement of the speech with the switching over to the first sound track because a certain time passes from the starting of the automatic switching-over device to the transference of the beam of light to the first sound track effected by the first succeeding switching-over, and during this time the speaker may have already begun his speech. For this case there is therefore advantageously inserted into the apparatus a film strip which has not at this stage the mark that controls the automatic-switching over device, and the apparatus is provided with a device controlled by the above mentioned hand switch for making this mark on the film strip. If for example the mark consists of a notch in the edge of the film strip, there is provided a notching device which is arranged at a short distance in front of the switch to be operated by this notch and which travels along a short distance with the film for example under the influence of the electro-magnetic means controlled by the hand switch, and then cuts a notch out of the film strip so that the first automatic switching-over and consequently the transference of the beam of light to the first sound track takes place immediately after the operation of the hand switch.

According to a further portion of the invention the device for automatically transversely shifting the beam of light on the film is constructed in such a manner that the beam of light (just as before the commencement of the writing or scanning of the first sound track of the film strip it was outside the utilizable width of the film band), after the completion of the writing or scanning of the last sound track is switched on again so that it is again outside the utilizable width of the film strip. This has the advantage that the apparatus need not be switched off with meticulous accuracy after the completion of the writing or reproduction of the last sound track, but rather can run on safely without the last of the sound track being again illuminated or scanned.

Some constructional examples of the invention are represented diagrammatically in the drawings.

Figure 1:
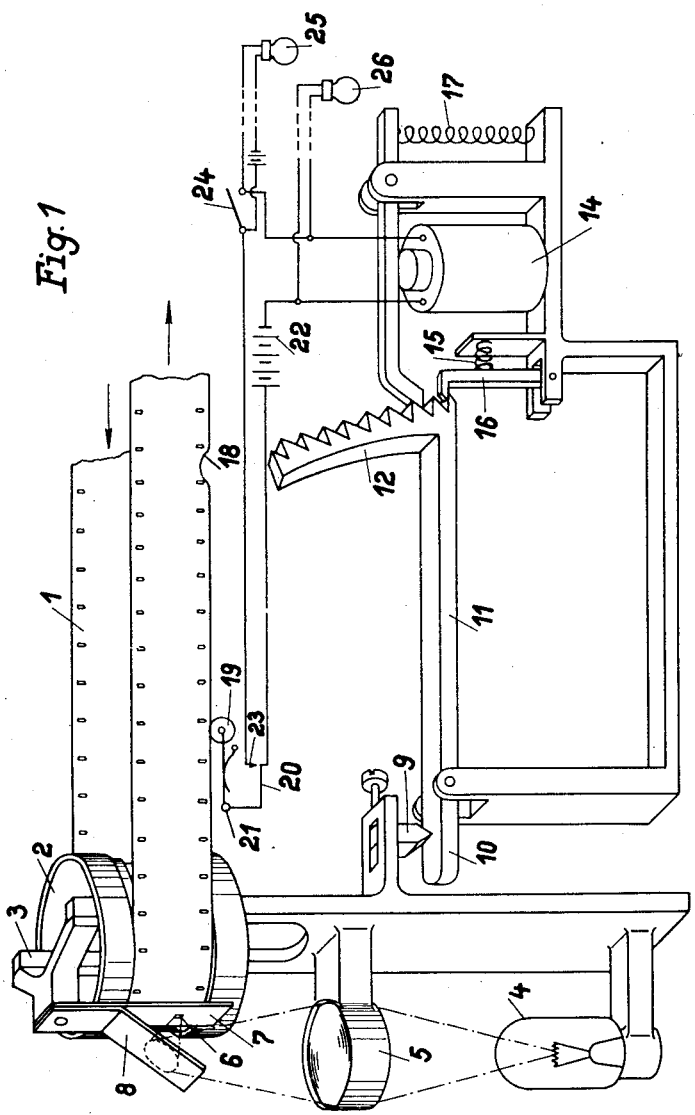
Figure 1 shows a perspective view of the parts of a recording apparatus important for the understanding of the invention.

In Figure 1 the film 1 is drawn off an endless spool by means of a toothed drum (not shown), passes around the drum 2, and is wound up again on the spool. In the drum 2 there is a vertically movable frame 3 which carries the recording lamp 4, a condenser 5, and a screen 7 which is provided with a slit 6 and to which is fastened a mirror 8 that directs the light upon the film through the slit. The frame 3 rests by means of the knife-edge 9 on the short arm 10 of a two-armed lever whose long arm 11 is provided at its end with a toothed segment 12. With the teeth of this segment engage the pawl-shaped armature 13 of the electromagnet 14 and also another spring (sic) 16 pressed by the spring 15 against the toothed segment. The armature 13 is raised by the spring 17.

The film 1 is provided at one place with a notch 18. On the edge of the film provided with the notch there bears a spring roller 19, which is mounted so as to be rotatable, together with the contact 20 fastened to it, about the point 21. The contact 20 is connected through a source of current 22 with one pole of the electromagnet 14 and the counter contact 23 is connected through a hand-switch 24 with the other pole of the magnet. In parallel with the switch 24 is a signal lamp 25 arranged in proximity to the recording microphone (not shown) and in parallel with the circuit of the electromagnet 14 is a second signal lamp 26 likewise arranged in proximity to the microphone.

The automatic moving forward of the beam of light from one sound track to the next is controlled by the notch 18 of the film strip, inasmuch as it closes the contacts 20 and 23 at each passage of the roller 19. When the switch 24 is closed, the magnet 14 is thereby energized and attracts its armature 13, which depresses the toothed segment 12 by one tooth and consequently raises the frame 3 with the optical means fastened thereon by the width of a sound track. As soon as the notch 18 has left the roller 19 the magnet 14 becomes free of current and the spring 17 raises the pawl 13 to the next tooth of the toothed segment, which is held by the pawl 16 in its position for the time being.

The toothed segment 12 has two teeth more than there are sound tracks to be recorded on the film, and it is adjusted in such a manner that when it is in its highest position and consequently when the pawl 16 engages with the lowest tooth the beam of light passing through the slit 6 impinges upon the perforated portion of the film outside the useful width thereof. If, now, the apparatus is started with the switch 24 open, the beam of light travels constantly along the perforated portion of the film. The contacts, it is true, are closed at each passing of the notch 18, but the beam of light nevertheless remains in its position because the magnet 14 is not energized. The lamps 25 and 26 are then likewise switched off (sic).

If, now, after the completion of the preparations for photographing, the switch 24 is closed shortly after the passing of the roller 19 by the notch 18, the lamp 25 is lit. This is a signal to the effect that the recording will begin after a time depending on the length of the film strip and its velocity, for example after three minutes in the case of a film length of 33 m. and a film velocity of 18.5 cm/sec. After the expiration of this time the notch 18 again passes the roller 19 and this time the magnet 14 is energized, so that the frame 3 is raised by the width of a sound track and the beam of light impinges upon the portion of the film strip that corresponds to the sound track first to be recorded. At the same time the lamp 26 is lit to indicate that the recording has begun.

On the energization of the magnet 14 following the completion of the writing of the last sound track, the pawl 13 engages the last and topmost tooth of the toothed segment 12 and thereby raises the frame 3 again by the width of a sound track, so that the beam of light passing through the gap 6 now impinges upon the upper perforated portion of the film and the film can run on safely without the last sound track's being illuminated again. After stopping the feeding of the film and removing the illuminated film, the frame is returned again into its original position by means of pressure exerted on the pawl 16 in opposition to the force of the spring 15, the switch 24 is opened again, and the apparatus is ready to be used again.

Figure 2:
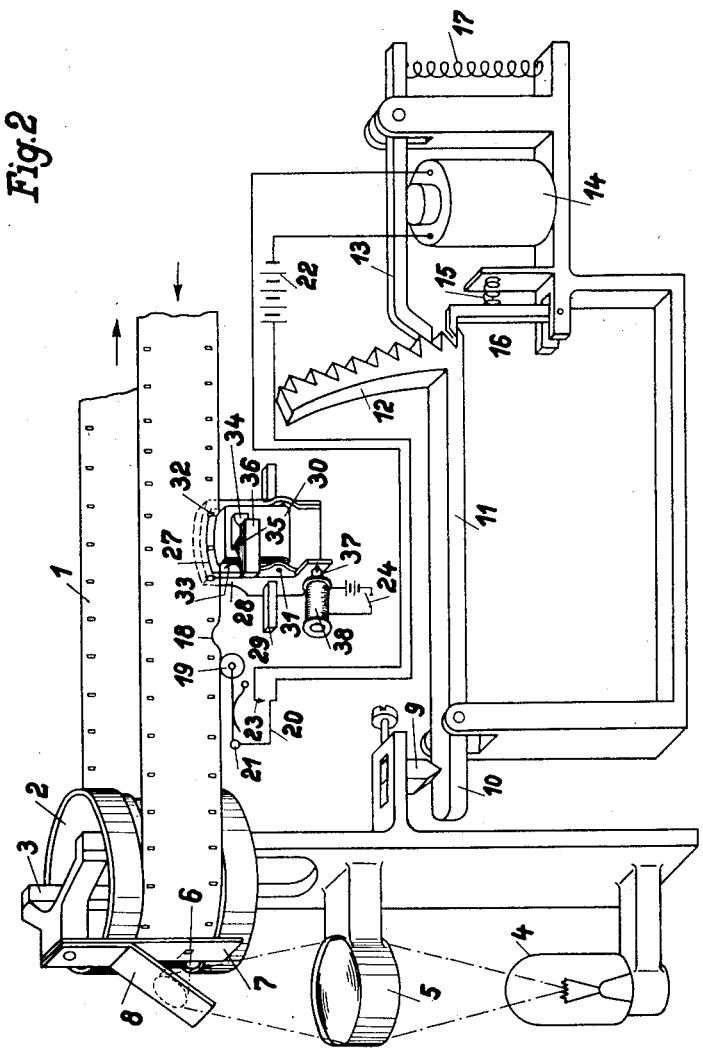
Figure 2 shows another construction of a recording apparatus.

Figure 2 shows an apparatus in which the recording starts immediately after the operation of the hand switch at the beginning of the first sound track. In this case there is inserted into the apparatus a film that is not yet provided with a notch and the making of the notch at the correct place in the film strip is effected in the apparatus itself. For this purpose a notching device is provided at some distance from the roller 19 at the side of the apparatus at which the film runs upon the drum 2. This notching device consists of a cheek 28 which is provided (with) a correspondingly formed sharp edge 27 and which is movable along a fixed rod 29 in the longitudinal direction of the film strip. The rod 29 is arranged in such a manner that the cheek 28 is located behind the film and at a short distance therefrom. To the cheek 28 there is fastened so as to be oscillatable about the axis 31 a second cheek 30 which is also provided with a sharp edge 32 and is located in front of the film. The two cheeks are held by means of a spring 33 at such a distance apart that the film can run between them without touching them. At the front of the cheek 30 there is provided a projection 34, which bears against a fixed block 36 provided with an excrescence 35. The cheek 28 carries a rod 37 which forms the core of a fixed solenoid 38, the energizing circuit of which can be closed by means of the hand switch 24.

When the apparatus is put into operation, the frame 3 is in its lowest position, as in the case of Figure 1, and the beam of light impinges upon the lower perforated portion of the film. The beam of light cannot yet be moved forward because there is not the notch in the film strip necessary for this purpose.

Now as soon as the speaker whose speech is to be recorded (for example) is ready to begin, the hand switch 24 is closed. The solenoid 38 is thus energised and attracts its core 37. The core takes the cheeks 28 and 30 with it in the direction of movement of the film and during this movement the excrescence 35 presses the cheek 30 by means of its excrescence 34 transiently with considerable force against the cheek 28, the sharp edges 27 and 32 of these cheeks cutting out a piece of the film. During the continuation of the movement of the cheeks the excrescence 34 slides off the excrescence 35 again and the cheeks open so that the film, now provided with a notch, can pass without hindrance. The notch (e. g. 18) produced in the film arrives directly at the roller 19 and produces the shifting of the beam of light to the first sound track, with which the recording begins. After the removal of the film carrying the record, the switch 24 is opened and the cheeks 28, 30 are pushed back into their original position.

Figure 3:
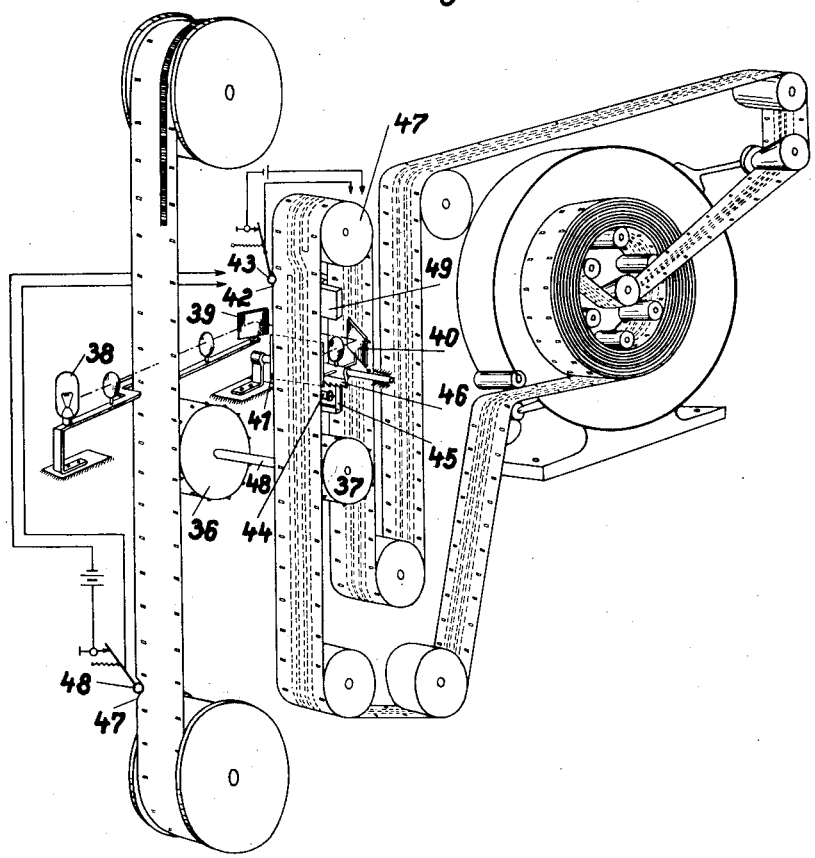
Figure 3 shows a copying apparatus according to the invention.

The construction shown in Fig. 1 is of course applicable without difficulty to reproducing apparatus, whilst for copying apparatus the arrangement shown in Figure 2 is better suited because it is here also a question of arranging the notch in the film in accordance with the actual commencement of the copying process. In order to facilitate this, the arrangement may also be such that the energising current of the solenoid is closed by a switch which is controlled by a mark made in the primary film at the place of the commencement of the sound record to be copied, for example a notch co-operating with a contact roller in the film strip edges (sic), as shown in Figure 3.

The transport of the endless primary film provided with a single-track sound record and of the endless secondary film on to which the sound record is to be transferred in several parallel tracks, is effected by means of two toothed drums, or sprockets, 36, 37 located on a common axle 48, light is passed through the original film from the source of light 38 and the beam of light is reflected upon the secondary film by means of the mirrors 39 and 40. In front of the secondary film there is provided a screen 41 which limits the beam of light laterally. The endless film strip is provided at one place with a notch 42. As soon as this notch passes the roller 43, which is constantly pressed against the edge of the film, this roller closes the circuit of the magnet 44, the armature of which by means of the lever 45 and the toothed rod 46 moves the mirror 40 and the screen 41 laterally by the width of a sound track so that now there is illuminated a strip adjacent to the strip of the film hitherto illuminated.

The primary film is provided also with a notch 47 in proximity to the beginning of the sound track and against the edge of the film there bears also a contact roller 48 which is connected with the solenoid of the notching device 49 formed according to Figure 2. In the case of the primary position of the mirror 40, the beam of light passing through the primary film impinges upon the perforated portion of the secondary film and remains constantly in this position because the secondary film first of all does not yet exhibit the notch 42, so that the circuit of the magnets 44 is constantly open. When now the notch 47 of the primary film passes the contact roller 48, the notching device 49 is operated in the above described manner and the secondary film is provided with a notch 42. Consequently the beam of light is moved laterally on the secondary film at the instant at which the commencement of the sound record of the primary film comes within its range, so that it illuminates the first sound track on the secondary film.

What I claim is:

1. In film apparatus having an endless film strip for photographic sound records arranged in several sound tracks located side by side, an optical system including a source of light for projecting a sharply defined beam of light toward the sound tracks, means for intermittently shifting the beam of light transversely of the film after each running off of a complete sound track, electromagnetic means for operating said shifting means, control means operatively associated with the film and adapted to be periodically operated thereby to actuate said electromagnetic means to move said shifting means, and means to direct the beam of light outside the useful width of the film before the beginning of the transverse shifting of said beam.

2. In film apparatus having an endless film strip for photographic sound records arranged in several sound tracks located side by side, an optical system including a source of light for projecting a sharply defined beam of light toward the sound tracks, means for intermittently shifting the beam of light transversely of the film after each running off of a complete sound track, an electromagnet for operating said shifting means, an electric circuit for actuating said electromagnet, a switch in said circuit, means for operating said switch including a part resiliently engaging an edge of the film strip, said edge having an indentation therein, and manually operable means for rendering the shifting means ineffective during the running off of the film strip, said shifting means including portions operatively connected to said optical system to direct the beam of light upon the film strip outside the useful width thereof before the beginning and after the termination of the transverse shifting of the beam.

3. In film apparatus having an endless film strip for photographic sound records arranged in several sound tracks located side by side which are run through successively, an optical system including a source of light for projecting a sharply defined beam of light toward the sound tracks, a feeding device for shifting the beam of light transversely of the film after each running off of a complete sound track, electromagnetic means for operating said feeding device, a circuit including a switch for controlling said electromagnetic means, means for controlling said switch including a part associated with the film strip whereby a modified portion of said strip in passing operates said switch controlling means to actuate said electromagnetic means, a second switch in series with said first switch operable to break the circuit regardless of the position of the first switch, an electrical signalling device, and an energizing circuit therefor associated with said second switch and operable thereby.

4. In film apparatus having an endless film strip for photographic sound records arranged in several sound tracks located side by side which are run through successively, an optical system including a source of light for projecting a sharply defined beam of light toward the sound tracks, a feeding device for shifting the beam of light transversely of the film after each running off of a complete sound track, electromagnetic means for operating said feeding device, a circuit including a switch for controlling said electromagnetic means, means for controlling said switch including a part associated with the film strip whereby a modified portion of said strip in passing operates said switch controlling means to actuate said electromagnetic means, a second switch in series with said first switch operable to break the circuit regardless of the position of the first switch, an electrical signalling device, an energizing circuit therefor associated with said second switch and operable thereby, a second signalling device, and means associated with said electromagnetic means and adapted to actuate said second signalling device to indicate the energization of said electromagnetic means.

5. In film apparatus having an endless film strip for photographic sound records arranged in several sound tracks located side by side which are run through successively, an optical system including a source of light for projecting a sharply defined beam of light toward the sound tracks, a feeding device for shifting the beam of light transversely of the film after each running off of a complete sound track, electromagnetic means for operating said feeding device, a circuit including a switch for controlling said electromagnetic means, means for controlling said switch including a part associated with the film strip whereby a modified portion of said strip in passing operates said switch controlling means to actuate said electromagnetic means, a second switch in series with said first switch operable to break the circuit regardless of the position of the first switch, an electrical signalling device, an energizing circuit therefor associated with said second switch and operable thereby, a second signalling device, means associated with said electromagnetic means and adapted to actuate said second signalling device to indicate the energization of said electromagnetic means, a microphone operatively connected to said apparatus, and means for positioning both of said signalling devices in proximity to the microphone in a position noticeable to the user thereof.

6. In an apparatus for photographic recording of sound on an endless film in several sound tracks located side by side, an optical system including a source of light for projecting a recording beam of light toward said film, a feeding device for intermittently shifting the beam of light transversely of the film strip one step for each cycle of operation of the film, said feeding device having portions for directing the beam of light through the film strip outside its useful width before beginning and after the termination of the sound recordings thereon, means associated with said film strip for actuating said feeding device periodically in response to the passage of a modified portion of said strip, and means operable at will for modifying a portion of said strip at any desired point while it is moving to determine the time of operation of said feeding device.

7. In an apparatus for photographic recording of sound vibrations on a moving, endless film strip in several sound tracks located side by side, an optical system including a source of light for projecting a sharply defined recording beam of light toward said film, a feeding device for intermittently shifting the beam of light transversely of the film strip one step for each cycle of operation of the film, said feeding device having portions for directing the beam of light through the film strip outside its useful width before beginning and after the termination of said intermittent shifting, a stamping device for stamping out an indentation in the edge of the film strip while it is moving, and means associated with the indented edge of the film strip for actuating said feeding device periodically each time an indentation passes said actuating means.

8. Apparatus according to claim 7 further characterized in that the stamping device includes a pair of cooperating cutting members located on opposite sides of the film strip and an electromagnet for operating the cutting device.

9. In a film apparatus for the photographic recording of sound vibrations on a moving, endless film strip in several sound tracks located side by side, an optical system including a source of light for projecting a sharply defined recording beam of light, a feeding device for intermittently shifting said beam of light transversely of the film one step after each recording of a full cycle of sound track, periodically energized electromagnetic means for operating said feeding device, means for controlling said electromagnetic means, a stamping device for stamping out an indentation in the edge of the film strip, means for supporting a portion of said control means in contact with the edge of the film strip for actuation by an indentation therein, said indentation being stamped out in precedence of said control portion with respect to direction of the movement of the film, means movably supporting said stamping device adjacent the path of movement of said film, means for moving said stamping device in the direction of movement of said film, and means operable at will for actuating said moving means.

10. In a film apparatus for the photographic recording of sound vibrations on a moving, endless film strip in several sound tracks located side by side, an optical system including a source of light for projecting a sharply defined recording beam of light, a feeding device for intermittently shifting said beam of light transversely of the film one step after each recording of a full cycle of sound track, periodically energized electromagnetic means for operating said feeding device, a stamping device for stamping out an indentation in the edge of the film strip, control means in contact with the edge of the film strip for actuation by an indentation therein for controlling said electromagnetic means, said indentation being stamped out in precedence of said control means with respect to the direction of the movement of the film, means movably supporting said stamping device adjacent the path of movement of said film, means for moving said stamping device in the direction of movement of said film, a stationary abutment positioned to engage a complementary abutment on said stamping device during its movement to effect its actuation, and means operable at will for actuating said moving means.

11. In apparatus for copying the sound records on one film strip upon a second moving, endless film strip in several sound tracks located side by side, an optical system including a source of light for projecting a sharp beam of light which projects the sound tracks of the primary film strip upon the secondary film strip, a feeding device for shifting the beam of light coming from the primary film transversely of the endless secondary film one step after the recording of a complete sound track, a periodically energized electromagnet and a circuit therefor for actuating said feeding device, an automatic switch in said circuit having a circuit closing lever operable to close said circuit to energize said electromagnet, a stamping device for stamping out an indentation in the edge of the secondary film, means mounting said closing lever in sliding engagement with said film edge whereby said indentation actuates the lever to close said circuit, and means operatively associated with said primary film and operated thereby to actuate said stamping device.

DÉNES von MIHÁLY.